Dec. 26, 1961
W. CHARCHAN ET AL
3,015,024
ILLUMINATED FLOWER POT HOLDER
Filed Feb. 24, 1961
2 Sheets-Sheet 1
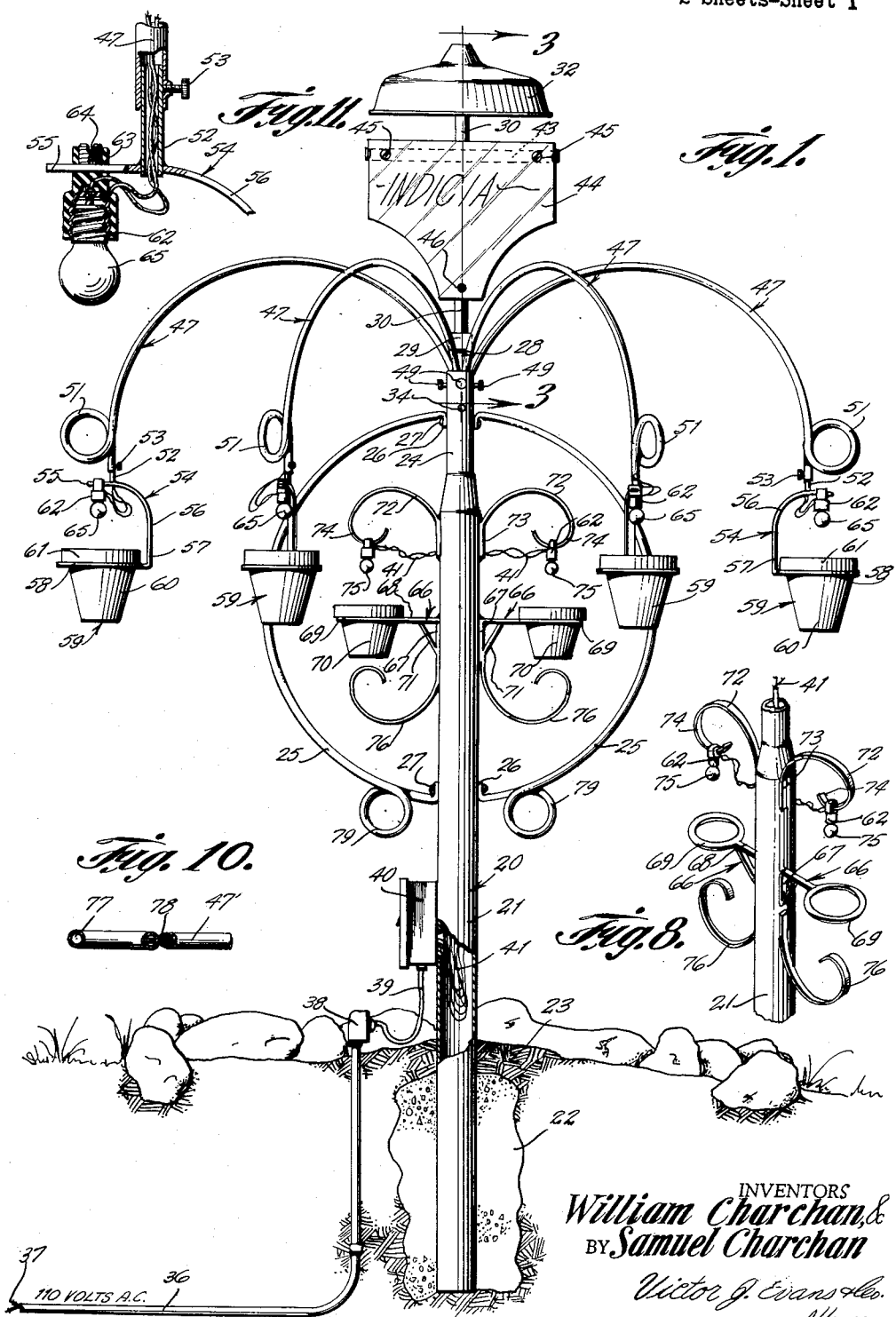
INVENTORS
William Charchan, &
BY Samuel Charchan
Victor J. Evans & Co.
Attorneys

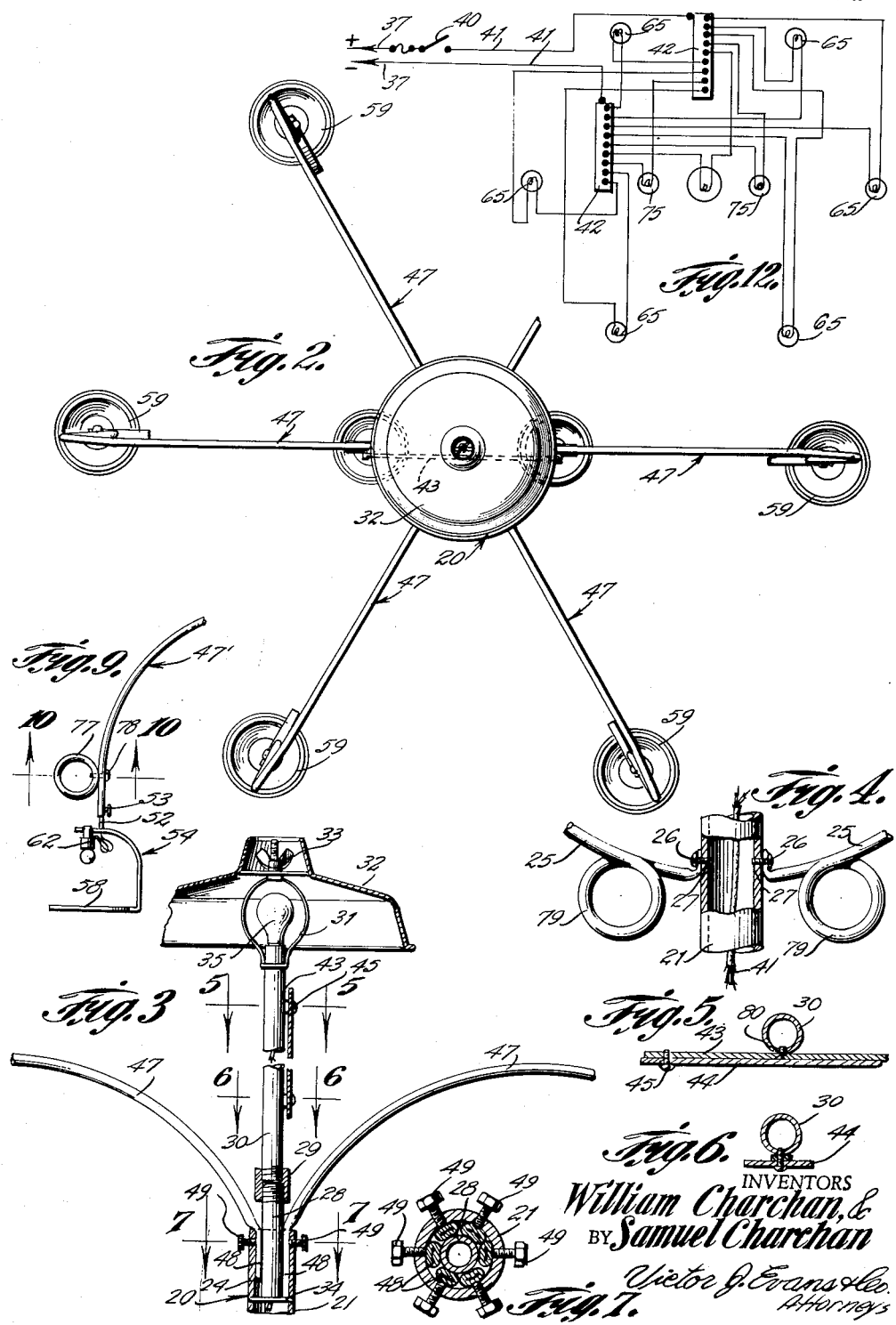

United States Patent Office 3,015,024
Patented Dec. 26, 1961

3,015,024
ILLUMINATED FLOWER POT HOLDER
William Charchan and Samuel Charchan, both of Rte. 2,
Standish, Mich.
Filed Feb. 24, 1961, Ser. No. 91,509
1 Claim. (Cl. 240—2)

The present invention relates to a flower stand, and more particularly to a flower stand for holding and supporting pots of flowers or plants as for example when such articles are being supported outdoors in the vicinity of homes or the like.

An object of the present invention is to provide a flower pot stand which includes a means for supporting a plurality of potted plants or flowers in such a manner that light bulbs are arranged adjacent to the various potted plants or flowers, and wherein the flower pot stand of the present invention also includes a means for supporting other accessories such as a name plate, lamp shade or the like.

Another object of the present invention is to provide a flower pot stand which is adapted to be conveniently mounted in a suitable location such as in front of a home so that the stand of the present invention can be firmly anchored in the ground or on the lawn, and wherein according to the present invention a plurality of flower pots having growing plants or flowers therein are adapted to be supported in such a manner that the growing plants or flowers will be displayed in the most attractive and efficient manner to insure that there will be sufficient clearance between the various potted plants and wherein the potted plants will be able to grow or thrive in the most advantageous or helpful manner.

A further object is to provide a flower pot stand of the type stated that is rugged in structure and foolproof in use, and further objects and advantages are to provide improved elements and arrangements thereof in a device of the character described that is economical to produce, durable in form, and conducive to the most economical use of the materials and uniformity of members formed therefrom.

Still further objects and advantages will become apparent in the subsequent description in the specification.

In the drawings:

FIGURE 1 is an elevational view of the flower pot holder or stand of the present invention, with parts broken away and in section.

FIGURE 2 is a top plan view thereof, with parts broken away and in section.

FIGURE 3 is a sectional view taken on the line 3—3 of FIGURE 1.

FIGURE 4 is a fragmentary sectional view illustrating certain constructional details of the present invention.

FIGURE 5 is a sectional view taken on the line 5—5 of FIGURE 3.

FIGURE 6 is a sectional view taken on the line 6—6 of FIGURE 3.

FIGURE 7 is a sectional view taken on the line 7—7 of FIGURE 3.

FIGURE 8 is a fragmentary perspective view showing a portion of the flower pot stand of the present invention.

FIGURE 9 is a fragmentary elevational view illustrating a modification.

FIGURE 10 is a sectional view taken on the line 10—10 of FIGURE 9.

FIGURE 11 is an enlarged fragmentary sectional view illustrating a portion of the bracket and its associated parts.

FIGURE 12 is a wiring diagram illustrating the electrical circuit schematically for the present invention.

Referring in detail to the drawings, and more particularly to FIGURES 1 through 8 and FIGURE 11 and FIGURE 12 of the drawings, the numeral 20 indicates the flower pot holder or stand of the present invention which includes a vertically disposed hollow standard 21 that has its lower end anchored in place as for example by means of concrete 22 which may be arranged in the ground 23, FIGURE 1. The upper end of the standard 21 is of reduced diameter as indicated by the numeral 24.

As shown in the drawings, there is provided a pair of diametrically opposed semi-circular members 25 which have flat end portions 26 that are secured to the standard 21 as for example by means of securing elements 27.

The numeral 28 indicates a vertically disposed post which is mounted in the upper end portion of the standard 21, and a fitting or bushing 29 is adapted to be arranged in threaded engagement with the upper end of the post 28, FIGURE 3. The numeral 30 indicates an upstanding rod which has its lower end threadedly engaging the fitting 29, and a clamp 31 is connected to the upper end of the rod 30, there being a top piece or lamp shade 32 connected as at 33 to the clamp 31. The numeral 34 indicates a stop pin which is mounted in the upper portion of the standard 21 for limiting downward movement of the post 28 in the standard 21. A light bulb 35 is mounted in the upper end of the rod 30 below the top piece 32, as for example as shown in FIGURE 3.

There is further provided for the present invention an electrical circuit which includes a conduit 36 that may be buried in the ground 23, FIGURE 1, and the conduit 36 may have wires or conductors 37 extended through, and these wires 37 are adapted to be connected to the suitable source of electrical energy. An outlet 38 is adapted to be arranged on the upper end of the conduit 36, and the outlet 38 is adapted to be electrically connected as at 39 to a switch box 40, and the electrical circuit further includes wires or conductors 41 which are electrically connected to the box 40, and these wires 41 are adapted to be connected to buss bars 42, FIGURE 12. Certain of the members which constitute the stand of the present invention are hollow so that the various wires or conductors can be extended through the interior of the hollow members in order to electrically connect the bulbs in the circuit in the most advantageous manner.

The numeral 43 indicates a horizontally disposed crosspiece which is arranged at right angles with respect to the rod 30, and a vertically disposed plate 44 has its upper portion secured to the cross-piece 43 as at 45, and the lower end portion of the plate 44 is adapted to be secured to the rod 30 as for example by means of a securing element or screw 46.

The flower pot stand of the present invention further includes a plurality of spaced apart radially disposed arcuate support members which are each indicated by the numeral 47, and each of these support members 47 has generally the same construction, and each support member 47 embodies a flat end portion 48, FIGURE 3. The flat end portions 48 of the support member 47 are arranged so that they project down into the upper portion of the standard 21, and as shown in FIGURE 7 these portions 48 surround the post 28 and are held in place by means of set screws of securing elements 49 which extend through the upper end of the standard 21 and which engage the flat portions 48.

The support members 47 are further provided with coiled sections 51 adjacent their outer ends, and vertically disposed arms 52 depend from the lower outer end portions of the support members 47, there being set screws or securing elements 53 extending through the outer ends of the support members 47 and engaging the arms 52 for maintaining the arms 52 immobile in their adjusted positions. That is, by loosening the securing elements 53 the arms 52 can be raised or lowered or adjusted in the ends of the support members 47, and then the securing elements 53 can be tightened in order to maintain the arms 52 immobile in their adjusted positions.

The numeral 54 indicates a bracket which is secured to or formed integral with the lower end of each arm 52, and each bracket 54 includes a generally horizontally disposed upper portion 55 as well as an intermediate curved section 56 and a vertically disposed lower section 57 that has a horizontally disposed circular base piece 58 secured thereto or formed integral therewith, and the base piece 58 is arranged substantially at right angles with respect to the lower vertical section 57. The numeral 59 indicates a flower pot which includes a tapering lower portion 60 that projects through the interior of the circular base piece 58, and each flower pot 59 further includes an upper enlarged or shouldered portion 61 which engages the upper surface of the circular base piece 58.

As shown in FIGURE 11 for example, insulated socket units or socket members 62 are provided with openings therein which are indicated by the numeral 63, and the upper portions 55 of the brackets 54 are adapted to extend through these openings 63 and the sockets 62 are maintained connected to the portions 55 by means of securing elements 64. A light bulb 65 depends from each socket 62, and it will be noted that the light bulbs 65 correspond in arrangement to the flower pots that are arranged therebelow.

As shown in the drawings there is further provided diametrically opposed support elements 66 which each include vertically disposed legs 67 that are suitably secured as by welding to the standard 21, and each support element 66 further includes a horizontally disposed element 68 that has a circular base piece 69 secured thereto or formed integral therewith, and a flower pot 70 is adapted to be supported by each base piece 69. Each support element 66 further includes an inclined brace 71.

Bracket members 72 are arranged above the support elements 66, and the bracket members 72 have their inner portions 73 suitably secured as by welding to the standard 21, and the bracket members 72 further include curved sections or portions 74 which have sockets such as the sockets 62 affixed thereto, FIGURE 1, and these sockets are adapted to have bulbs 75 depending therefrom, and the bulbs 75 are arranged above the flower pots 70.

The numeral 76 designates each of a pair of generally curved members or elements which are secured in any suitable manner to the standard 21, and the members 76 are arranged below the flower pots 70.

Attention is now directed to FIGURES 9 and 10 of the drawings, where it will be seen that there is illustrated modified support members which are indicated generally by the numeral 47', and the support members 47' are adapted to be used in substantially the same manner as the previously described support members 47. However the support members 47' do not have the coiled sections 51, but instead circular elements or members 77 are secured to the outer portions of the support members 47 as for example by means of securing elements 78.

The semi-circular members 25 have coiled or looped portions 79 therein, as for example as shown in FIGURES 1 and 4.

The crosspiece 43 is adapted to be fastened to the rods 30 as at 80, FIGURE 5.

From the foregoing, it is apparent that there has been provided a stand which is especially suitable for use in supporting flower pots and the like in a desired location such as in front of a home or other dwellings or buildings, and the stand 20 of the present invention may be arranged as shown in the drawings wherein it will be seen that the vertically disposed standard 21 has its lower end embedded in the concrete 22, so that the standard 21 will be properly anchored in place to project upwardly from the ground 23. The stand of the present invention is constructed so that it can be readily disassembled and readily assembled so that for example when the standard 21 is not being used it can be shipped or arranged in a compact position with the parts taken apart so as to insure the device will occupy a minimum amount of space for storage and shipment.

When the device is being used the parts are in the position such as that shown in FIGURES 1 and 2 and the standard 21 may be either anchored in the concrete 22 or else it may be arranged so that such concrete is not used. Electrical energy is adapted to be supplied from a suitable source of supply as for example from a suitable outlet in an adjacent house or the like, and this electrical energy will be supplied through the wires 37 which extend through the underground conduit 36, FIGURE 1. The standard has its upper end open and the vertically disposed post or element 28 is mounted in the upper end portion of the standard 21, and downward movement of the post 28 in the standard is limited by the stop pin 34, FIGURE 3. The fitting 29 serves to connect the rod 30 to the post 28, and the bulb 35 is suitably mounted in the upper end of the rod 30, and the shade 32 is arranged above the bulb 35 so as to help direct the light rays emitted by the bulb 35 downward and outwardly in the proper direction to most efficiently and effectively illuminate the flowers in the various flower pots.

In addition there is provided the support members 47 which have their flat end portions 48 secured in the upper end of the standard as at 49, and these support members 47 are arranged in radial formation so that the flower pot 59 will be evenly spaced apart in order to insure that the plants or flowers in the pots 59 will have sufficient room in which to grow or thrive.

Each of the support members 47 has an arm 52 depending from its outer end, and the position of the arms 52 and its associated parts can be adjusted due to the provision of the set screws 53. A bracket 54 is secured to or formed integral with each arm 52, and the bracket 54 includes an integral circular piece 58 which provides a support for the flower pots 59. In addition the upper portion 55 of the bracket 54 provides a support for the socket 62 from which depends the bulbs 65, and these bulbs 65 are arranged slightly above the flower pots 59 and the bulbs 65 not only provide illumination for the plants or flowers in the pots 59 so that such growing articles can be viewed with maximum benefit and esthetic appeal, but in addition the bulbs 65, being positioned just above the pots 59, supply a certain amount of heat which is beneficial to the plants or flowers in the pots 59, and in addition heat from such bulbs can be used to ward off harmful frost or the like.

The flower pots 70 are also adapted to have growing plants or flowers therein, and the bulbs 75 which are supported by the members 72 serve the same purpose in connection with the flower pots 70 as the bulbs 65 do in connection with the pots 59.

The plates 44 may have indicia thereon such as the name and street address of the owner of a house or dwelling that is arranged rearwardly of the stand 20, and the stand 20 for example may be arranged at a convenient and attractive location on the front lawn of a home. Not only will the present invention provide certain important functional and utilitarian functions, but it is also highly decorative and will enhance or increase the attractiveness or esthetic appeal of a particular area on which it is being used.

The electric wires for supplying energy to the bulbs are adapted to be extended through the hollow standard 21 and certain of these wires may be extended through the interior of the hollow support members 47 so that energy can be supplied for energizing or actuating the various bulbs.

The parts can be made of any suitable material and in different shapes or sizes.

Minor changes in shape, size and a rearrangement of details coming within the field of invention claimed may be resorted to in actual practice, if desired.

What is claimed is:

A stand comprising a vertically disposed hollow standard having its lower end anchored in the ground, a vertically disposed post mounted in the upper end of said standard, a fitting connected to the upper end of said post, a vertically disposed rod having its lower end connected to said fitting, a lamp shade supported above said rod, a bulb mounted in the upper end of said rod below said lamp shade, an electric circuit including conductors extending through said standard and electrically connected to said bulb and said conductors adapted to be connected to a source of electric energy, a plate supported on said rod, arcuate support members having flat end portions projecting into the upper end of said standard and said flat end portions surrounding said post, securing elements extending through said standard and engaging the flat end portions of said support members, said support members being arranged radially about an axis extending through said standard, arms depending from the outer ends of said support members, securing elements extending through said support members and engaging said arms, brackets each including a generally horizontally disposed upper portion affixed to a lower end of a corresponding arm, each bracket further including an intermediate curved section and a vertically disposed lower section having a horizontally disposed annular base piece affixed thereto, and said basepiece being arranged at right angles with respect to the vertically disposed lower section of the bracket, said basepieces adapted to have flower pots supported therein, socket units having openings therein for the projection therethrough of the upper portions of said brackets, securing elements in the upper portions of said sockets engaging the upper portions of said brackets, and bulbs depending from said sockets and electrically connected in said circuit and said bulbs being arranged just above the flower pots.

References Cited in the file of this patent

UNITED STATES PATENTS

| | | |
|---|---|---|
| 1,406,893 | Randall | Feb. 14, 1922 |
| 1,834,428 | Seitz | Dec. 1, 1931 |
| 1,853,523 | Titman | Apr. 12, 1932 |
| 2,027,575 | Buck | Jan. 14, 1936 |
| 2,060,005 | Fletcher et al. | Nov. 10, 1936 |
| 2,092,691 | Berghoff | Sept. 7, 1937 |
| 2,104,256 | Hambeck | Jan. 4, 1938 |
| 2,922,031 | Stiffel | Jan. 19, 1960 |